United States Patent
Izumi et al.

(10) Patent No.: US 10,614,584 B2
(45) Date of Patent: Apr. 7, 2020

(54) THREE-DIMENSIONAL DISTANCE MEASUREMENT APPARATUS

(71) Applicant: Hitachi-LG Data Storage, Inc., Tokyo (JP)

(72) Inventors: Katsuhiko Izumi, Tokyo (JP); Naoya Matsuura, Tokyo (JP); Toshimasa Kamisada, Tokyo (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 47 days.

(21) Appl. No.: 15/984,449

(22) Filed: May 21, 2018

(65) Prior Publication Data

US 2019/0073781 A1   Mar. 7, 2019

(30) Foreign Application Priority Data

Sep. 4, 2017  (JP) ................................ 2017-169404

(51) Int. Cl.
*A61B 6/02*    (2006.01)
*G06T 7/521*   (2017.01)

(52) U.S. Cl.
CPC .......... *G06T 7/521* (2017.01); *G06T 2200/04* (2013.01)

(58) Field of Classification Search
CPC ............................ G06T 7/521; G06T 2200/04
See application file for complete search history.

(56) References Cited

U.S. PATENT DOCUMENTS

| | | | |
|---|---|---|---|
| 6,741,082 B2* | 5/2004 | Ono | G01S 17/08 250/559.38 |
| 8,767,189 B2* | 7/2014 | Mase | G01S 7/4863 257/225 |
| 9,921,312 B2* | 3/2018 | Takano | G01S 17/89 |
| 10,145,670 B2* | 12/2018 | Georgeson | G01B 11/002 |
| 2009/0148038 A1* | 6/2009 | Sawachi | H04N 13/128 382/154 |
| 2009/0210193 A1 | 8/2009 | Nagase | |
| 2011/0063437 A1* | 3/2011 | Watanabe | G01S 7/4802 348/140 |
| 2013/0194390 A1* | 8/2013 | Hirooka | G01C 11/025 348/47 |
| 2013/0235364 A1* | 9/2013 | Kyung | G01S 17/50 356/5.01 |
| 2015/0185325 A1* | 7/2015 | Park | G01S 17/88 356/5.01 |
| 2019/0073781 A1* | 3/2019 | Izumi | G06T 7/521 |

FOREIGN PATENT DOCUMENTS

JP    2009-174830 A    8/2009

\* cited by examiner

*Primary Examiner* — Gregory M Desire
(74) *Attorney, Agent, or Firm* — Mattingly & Malur, PC

(57) ABSTRACT

A three-dimensional distance measurement apparatus include: a plurality of light sources 11 that irradiate light onto the subject; a light emission control unit 12 that controls light emission from a plurality of light sources; a light-receiving unit 13 that detects reflection light from the subject; a distance-calculating unit 14 that calculates a distance to the subject on the basis of a transmission time of reflection light; and an image processing unit 15 that creates a distance image of the subject on the basis of calculated distance data. The plurality of irradiation areas 3 onto which light from the light sources are irradiated are arranged to partially overlap only with the neighboring ones. The light emission control unit 12 individually turns on or off the light sources 11 or individually adjusts the emitted light amounts.

5 Claims, 15 Drawing Sheets

F I G. 1
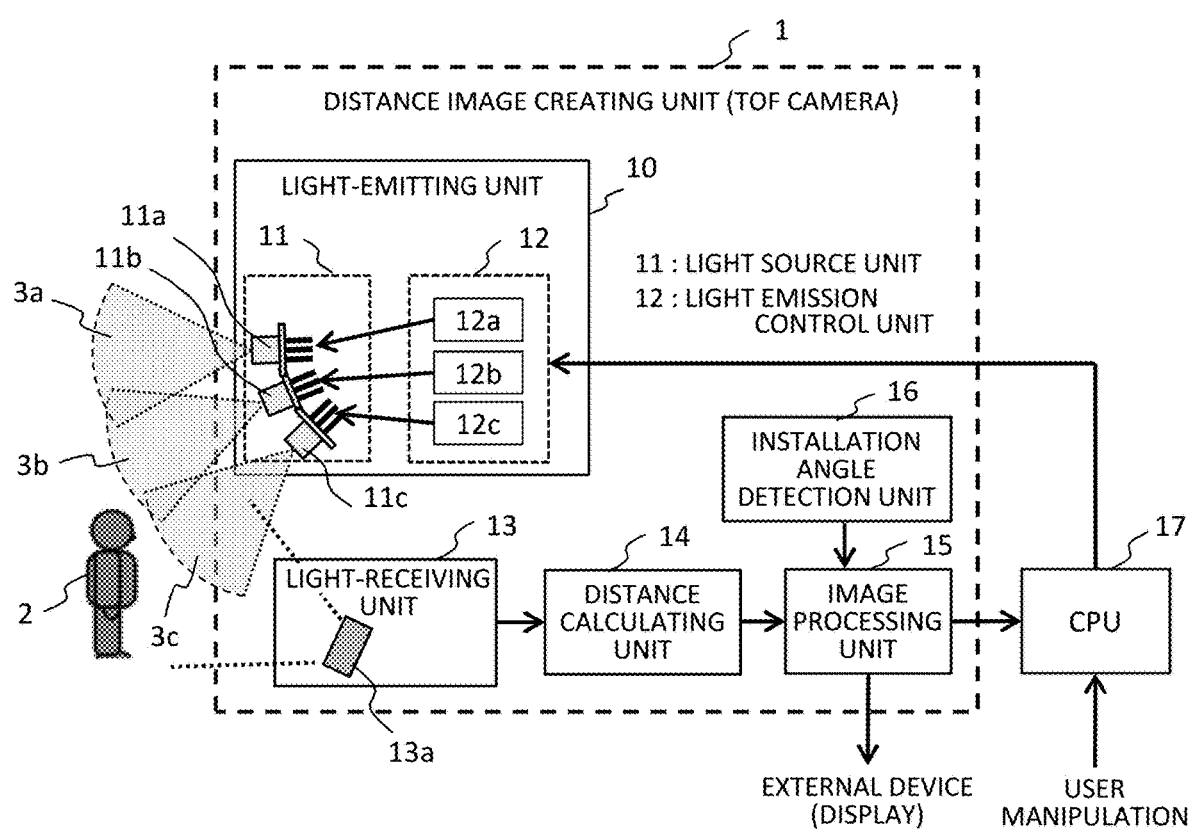

WHEN ALL LIGHT SOURCES ARE TURNED ON

DISTRIBUTION OF IRRADIATED LIGHT AMOUNT (CROSS SECTION A-A')

WHEN LIGHT SOURCES ARE PARTIALLY TURNED OFF

DISTRIBUTION OF IRRADIATED LIGHT AMOUNT (CROSS SECTION A-A')

WHEN THERE IS CEILING REFLECTION
(ALL LIGHT SOURCES ARE TURNED ON)

WHEN THERE ARE MULTIPLE PATHS
(ALL LIGHT SOURCES ARE TURNED ON)

WHEN THERE IS AMBIENT LIGHT
(ALL LIGHT SOURCES ARE TURNED ON)

WHEN THERE IS NO AMBIENT LIGHT
(LIGHT SOURCES ARE PARTIALLY TURNED OFF)

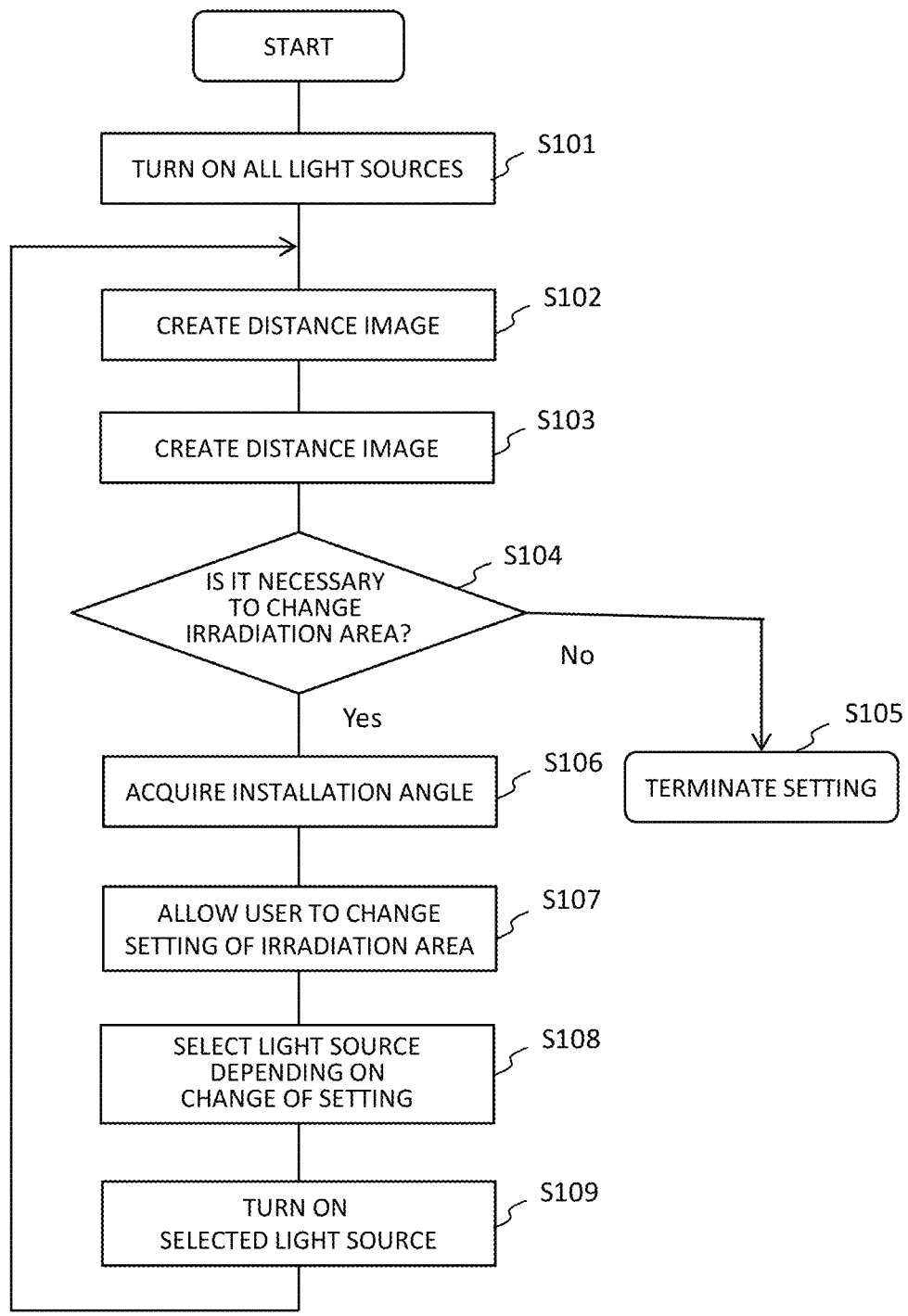

WHEN EACH LIGHT SOURCE IS TURNED ON WITH SAME LIGHT AMOUNT

DISTRIBUTION OF IRRADIATED LIGHT AMOUNT (CROSS SECTION A-A')

LIGHT AMOUNT La = Lb = Lc

F I G. 1 1 A
WHEN EACH LIGHT SOURCE IS TURNED ON WITH DIFFERENT LIGHT AMOUNT
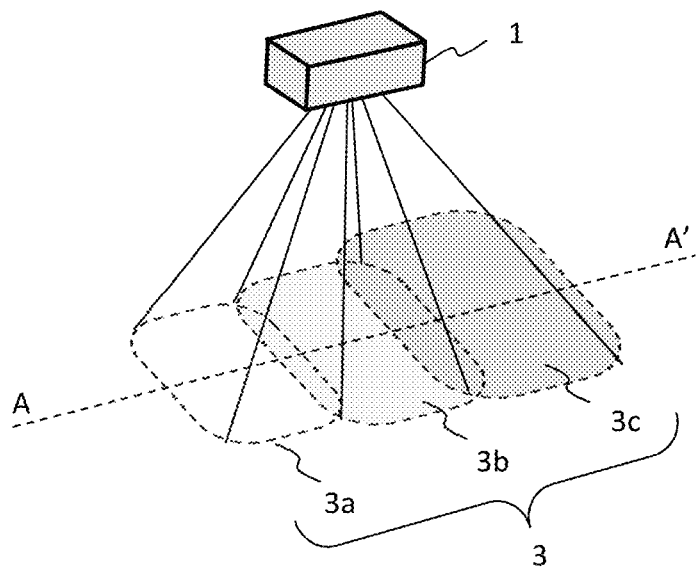
F I G. 1 1 B
DISTRIBUTION OF IRRADIATED LIGHT AMOUNT (CROSS SECTION A-A')
LIGHT AMOUNT La < Lb < Lc
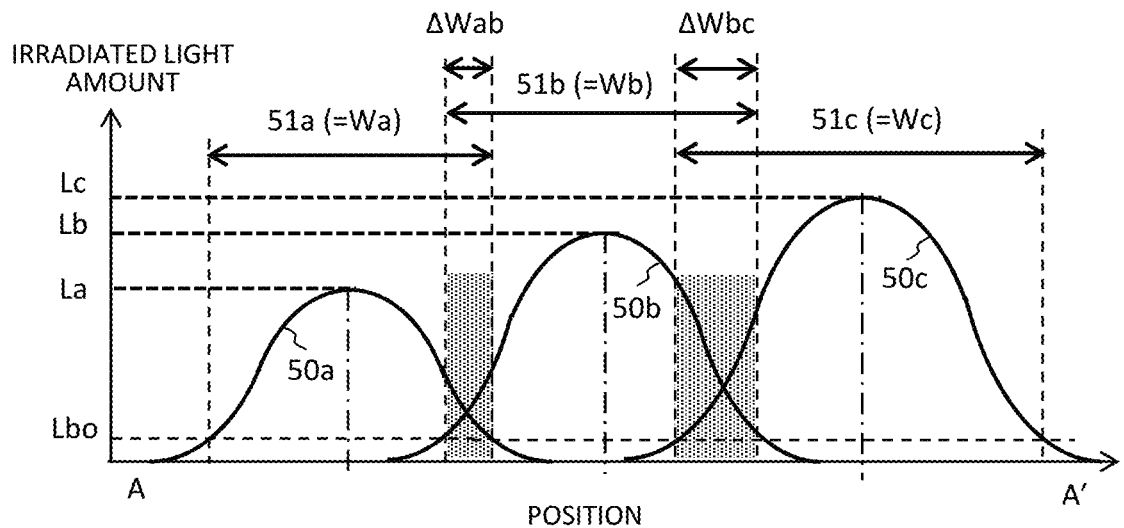

MULTIPLE SUBJECTS (IRRADIATED LIGHT AMOUNT IS EQUAL IN EACH AREA)

MULTIPLE SUBJECTS (IRRADIATED LIGHT AMOUNT IS DIFFERENT IN EACH AREA)

MULTIPLE SUBJECTS (IRRADIATED LIGHT AMOUNT IS EQUAL IN EACH AREA)

MULTIPLE SUBJECTS (IRRADIATED LIGHT AMOUNT IS DIFFERENT IN EACH AREA)

THREE-DIMENSIONAL DISTANCE MEASUREMENT APPARATUS

CLAIM OF PRIORITY

The present application claims priority from Japanese patent application serial No. JP 2017-169404, filed on Sep. 4, 2017, the content of which is hereby incorporated by reference into this application.

BACKGROUND OF THE INVENTION

(1) Field of the Invention

The present invention relates to a three-dimensional distance measurement apparatus that outputs a position of a subject such as a person as a distance image.

(2) Description of the Related Art

There is known a distance measurement apparatus (distance measuring equipment: DME) that measures a distance to a subject on the basis of light transmission time (hereinafter, referred to as a "time-of-flight (TOF) method") and outputs the distance as an image (distance image). For example, a person location detection apparatus discussed in JP 2009-174830 A has a distance displacement detection means that detects a distance displacement to an object in an indoor space on the basis of distance information from a TOF-based distance image sensor, and a person determination means that determines whether or not the detected object is a person by specifying a shape of the detected distance displacement area, so that a direction and a distance to the distance displacement area having a shape specified as a person is detected as a person location.

SUMMARY OF THE INVENTION

In the technique of JP 2009-174830 A, a distance to an indoor object is measured, and it is determined whether or not the detected object is a person by detecting a distance displacement area on the basis of a temporal change amount of the measurement value and comparing a characteristic of the detected distance displacement area with a characteristic of a person shape registered in advance.

In order to accurately measure a three-dimensional distance to a subject, it is necessary to irradiate light onto each subject in a room and accurately detect the light reflected on each subject. However, the light returning to the distance measuring equipment is weak. In addition, for example, if there is unnecessary light such as reflection light from any object other than the subject such as an indoor ceiling, it acts as a disturbance component and makes it difficult to accurately perform measurement. In addition, when there are a plurality of subjects having different distances, it may be difficult to normally measure the distance because a reflection light intensity from a distant subject is weaker in some cases. Such a phenomenon is generated because a range or an amount of the irradiation light is not appropriately set depending on a situation of the subject. The techniques of the related art including JP 2009-174830 A described above do not particularly consider an irradiation environment depending on a situation of a subject.

An object of the invention is to provide a TOF-based three-dimensional distance measurement apparatus capable of suppressing degradation of accuracy in distance measurement by appropriately setting a range or an amount of the irradiation light depending on a situation of a subject.

According to an aspect of the invention, there is provided a three-dimensional distance measurement apparatus that outputs a position of a subject as a distance image, including: a plurality of light sources that irradiate light onto the subject; a light emission control unit that controls light emission from a plurality of light sources; a light-receiving unit that detects reflection light from the subject; a distance-calculating unit that calculates a three-dimensional distance to the subject on the basis of a transmission time of reflection light detected by the light-receiving unit; and an image processing unit that creates a two-dimensional distance image of the subject on the basis of distance data calculated by the distance-calculating unit. The plurality of irradiation areas onto which light from the plurality of light sources are irradiated are arranged to partially overlap only with the neighboring ones. In addition, the light emission control unit individually turns on or off the plurality of light sources and individually adjusts the emitted light amount.

According to the invention, it is possible to provide a three-dimensional distance measurement apparatus capable of suppressing degradation of accuracy in TOF-based distance measurement by appropriately setting a range or an amount of irradiated light depending on a situation of a subject.

BRIEF DESCRIPTION OF THE DRAWINGS

These and other features, objects and advantages of the present invention will become more apparent from the following description when taken in conjunction with the accompanying drawings wherein:

FIG. 1 is a block diagram illustrating a three-dimensional distance measurement apparatus according to a first embodiment;

FIG. 5A is a diagram illustrating irradiation areas in a case where all laser light sources are turned on;

FIG. 5B is a diagram illustrating irradiated light amount distributions in a case where all laser light sources are turned on;

FIG. 8A is a diagram illustrating an exemplary distance image in a case where all of the light sources are turned on;

FIG. 9 is a flowchart illustrating an irradiation area setting process;

FIG. 11A is a diagram illustrating irradiation areas in a case where the laser light sources are turned on with different light amounts;

FIG. 11B is a diagram illustrating irradiated light amount distributions in a case where the laser light sources are turned on with different light amounts;

DETAILED DESCRIPTION OF THE EMBODIMENT

Figure 2A:
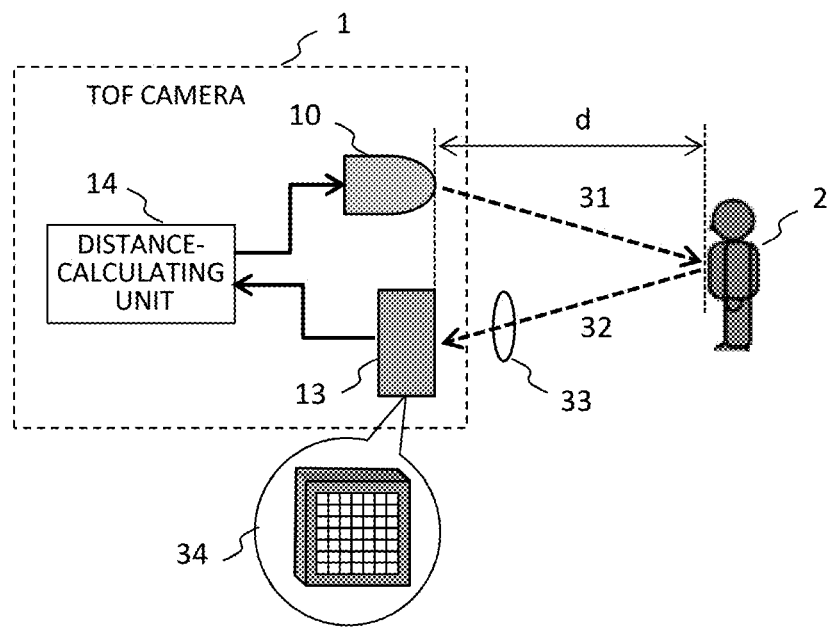
FIG. 2A is a diagram illustrating a principle of TOF-based distance measurement.

Embodiments of the invention will now be described with reference to the accompanying drawings.

First Embodiment

In the first embodiment, a plurality of light sources are individually turned on to change irradiation areas for a subject.

FIG. 1 is a block diagram illustrating a three-dimensional distance measurement apparatus according to the first embodiment. In the following example, it is assumed that a position of a person as a subject is detected. The three-dimensional distance measurement apparatus measures a distance to the subject including a person using a time-of-flight (TOF) method, and the distances to each part of the subject are displayed, for example, with different colors so as to output a distance image. In the three-dimensional distance measurement apparatus, a central processing unit (CPU) 17 controls a distance image creation unit 1 (hereinafter, referred to as a TOF camera) that creates a distance image on the basis of the TOF method.

The TOF camera 1 has a light-emitting unit 10 having a laser diode (LD) or a light-emitting diode (LED) that irradiates pulse light onto a subject 2, a light-receiving unit 13 having a charge-coupled device (CCD) sensor or a complementary metal oxide semiconductor (CMOS) sensor that receives the pulse light reflected from the subject 2; a distance-calculating unit 14 that calculates a distance to the subject 2 from a detection signal of the light-receiving unit 13; an image processing unit 15 that processes distance data output from the distance-calculating unit 14 to output a distance image of the subject 2; and an installation angle detection unit 16 that detects an installation angle of the TOF camera 1. The TOF camera 1 is controlled by the CPU 17 to measure the three-dimensional distance. Now, configurations and functions of each element will be described in details.

The light-emitting unit 10 of the TOF camera 1 has a light source unit 11 having a plurality of laser light sources (LD), and a light emission control unit 12 that turns on or off each laser light source or adjusts the emitted light amount. In this embodiment, the light source unit 11 has three laser light sources 11a, 11b, and 11c, and the laser light emitted from each laser light source can be irradiated onto irradiation areas 3a, 3b, and 3c, respectively. Here, irradiation directions of each laser light source 11a, 11b, and 11c are set to be different in order to partially overlap the irradiation areas 3a, 3b, 3c only with the neighboring ones.

The light emission control unit 12 has laser driving circuits for driving the laser light sources such that the laser light sources are mated with the laser driving circuits one by one. In this embodiment, three laser light sources 11a, 11b, and 11c correspond with three laser driving circuits 12a, 12b, and 12c, respectively, in order to control turn-on or turn-off operations of the laser light sources of the light source unit 11 in response to a command from the CPU 17.

The light reflected from the subject 2 is detected by the CCD sensor 13a mounted on the light-receiving unit 13, and a signal obtained by optoelectrically converting the detected light is transmitted to the distance-calculating unit 14. The distance-calculating unit 14 calculates a distance to the subject 2 and transmits distance data of the subject 2 to the image processing unit 15.

The image processing unit 15 creates a distance image by performing a colorization process for changing color of the subject image on the basis of the distance data, and outputs and displays the distance image on an external device (display). The image processing may include a process of changing brightness, contrast, or the like. A user can easily recognize the position (distance) and the shape (posture) of the subject 2 (such as a person) by visually checking the colorized distance image. In addition, the intensity of the reflection light detected by the light-receiving unit 13 is displayed on the external device (display) as necessary. If the displayed distance image is imperfect, or the reflection light intensity is excessive or short, a user may change the irradiation area setting or the irradiated light amount distribution using an input device of the CPU 17.

The installation angle detection unit 16 includes, for example, an acceleration sensor. A three-dimensional coordinate value of the subject 2 can be obtained during the image processing by transmitting the posture information of the TOF camera 1 obtained here to the image processing unit 15.

Figure 2B:
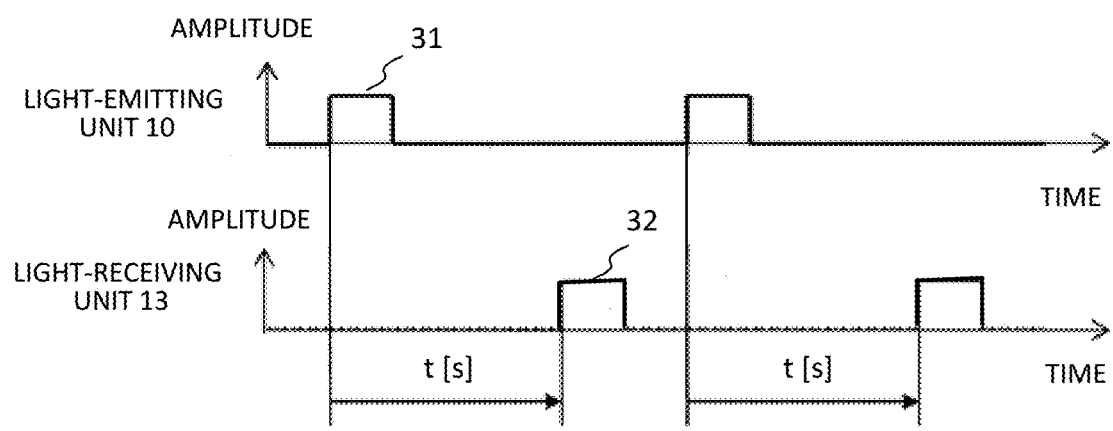
FIG. 2B is a diagram illustrating a principle of TOF-based distance measurement.

FIGS. 2A and 2B are diagrams illustrating a principle of the TOF-based distance measurement. In the TOF method, the distance is calculated from a time difference between an emitted light signal and the received light signal.

FIG. 2A is a diagram illustrating a relationship between the TOF camera (distance image creation unit) 1 and a subject (for example, a person). The TOF camera 1 has a light-emitting unit 10 and a light-receiving unit 13 and emits distance measurement light 31 from the light-emitting unit 10 to the subject 2. Infrared light is employed as the emitted light. The light-receiving unit 13 receives reflection light 32 reflected on the subject 2 using a two-dimensional sensor 34 such as a charge-coupled device (CCD) through an object lens 33. The subject 2 is placed at a distance of "d" [m] from the light-emitting unit 10 and the light-receiving unit 13. Here, the distance "d" [m] to the subject 2 can be expressed as:

$$d\ [m] = c\ [m/s] \times t\ [s]/2 \tag{1}$$

where "c[m/s]" denotes a velocity of light, and "t[s]" denotes a time difference until the light-receiving unit 13 receives the reflection light from the start of light emission of the light-emitting unit 10.

FIG. 2B is a diagram illustrating measurement of the time difference "t". The distance-calculating unit 14 measures the time difference "t" between the timing of the light 31 emitted from the light-emitting unit 10 and the timing at which the light-receiving unit 13 receives the reflection light 32, and calculates the distance d from the subject 2 on the basis of Formula (1). In addition, a distance difference at each position of the subject, that is, unevenness of the subject can be obtained from a variation of the light-receiving timing at each pixel position of the two-dimensional sensor 34.

Figure 3:
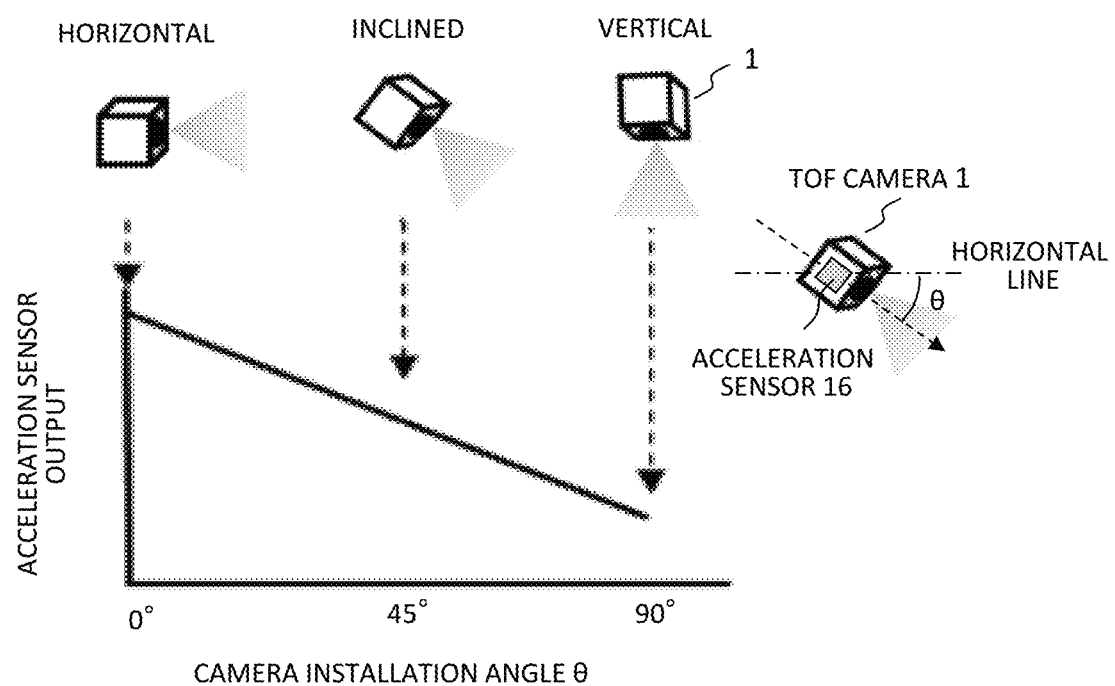
FIG. 3 is a diagram illustrating an operation of an installation angle detection unit.

FIG. 3 is a diagram illustrating operation of the installation angle detection unit. The installation angle detection unit 16 includes, for example, an acceleration sensor and detects an installation angle θ of the TOF camera 1 from its sensor output value. That is, the installation angle detection unit 16 detects whether the light emission direction from the TOF camera 1 is horizontal (θ=0°), vertical (θ=90°), or sloped (for example, θ=45°). The posture information of the TOF camera 1 obtained here is transmitted to the image processing unit 15, so that the three-dimensional coordinates of the subject 2 can be calculated during the image processing.

Figure 4A:
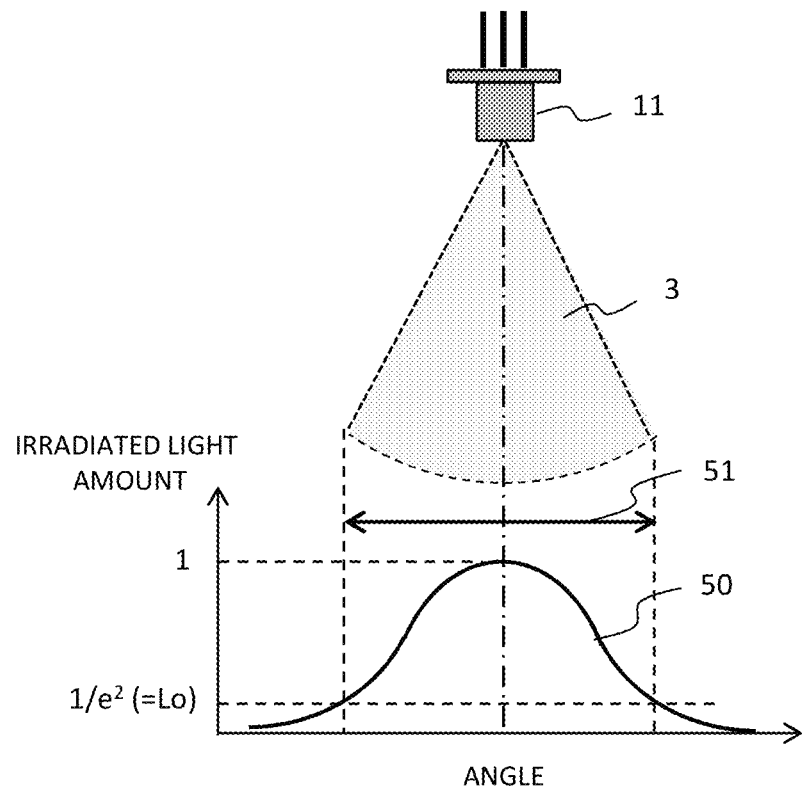
FIG. 4A is a diagram illustrating a distribution of an irradiated light amount from a single laser light source.

FIG. 4A is a diagram illustrating a distribution of the irradiated light amount from one of the laser light sources. The light emitted from the laser light source 11 has a predetermined angle width to irradiate a range of the irradiation area 3. In this case, an irradiated light amount distribution 50 within the irradiation area has a Gaussian distribution, in which a range equal to or larger than "1/e^2 (=Lo, threshold value)" is defined as an irradiation range 51. In the following description, unless specified otherwise, the irradiation area 3 refers to a size of this irradiation range 51. Although a widening angle or an irradiated light amount distribution is illustrated by way of example by assuming that the light emitted from the laser light source has a Gaussian distribution herein, the invention is not limited thereto. Alternatively, an irradiated light amount distribution different from the Gaussian distribution may also be employed by changing the widening angle of the laser light source or placing an optical element such as a diffusion plate, a microlens array, or a lens in a path of the light emitted from each laser light source although not shown in the drawings. Similarly, in this case, a range equal to or larger than "1/e^2 (=Lo)" is defined as the irradiation range 51.

Figure 4B:
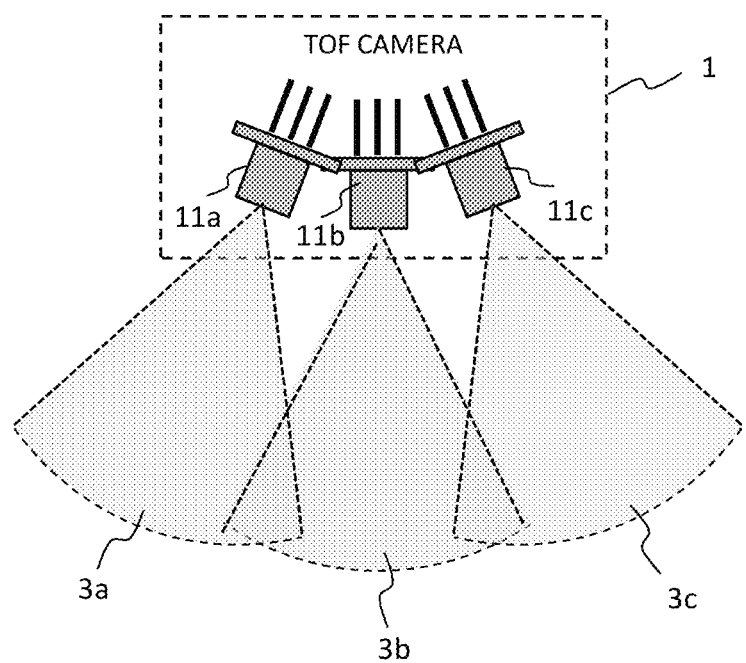
FIG. 4B is a diagram illustrating arrangement of a plurality of laser light sources and superimposition of irradiation areas.

FIG. 4B is a diagram illustrating arrangement of a plurality of laser light sources and overlapping of the irradiation areas. In this example, it is assumed that three laser light sources 11a, 11b, and 11c are arranged inside the TOF camera 1. Each light emitted from the three laser light sources 11a, 11b, and 11c is oriented such that the irradiation areas 3a, 3b, and 3c partially overlap only with neighboring ones. That is, the irradiation area 3a partially overlaps with the irradiation area 3b, while the irradiation area 3a does not partially overlap with the irradiation area 3c. The irradiation area 3b partially overlaps with the irradiation areas 3a and 3c in different areas. The irradiation area 3c does not partially overlap with the irradiation area 3a.

Figure 5A:
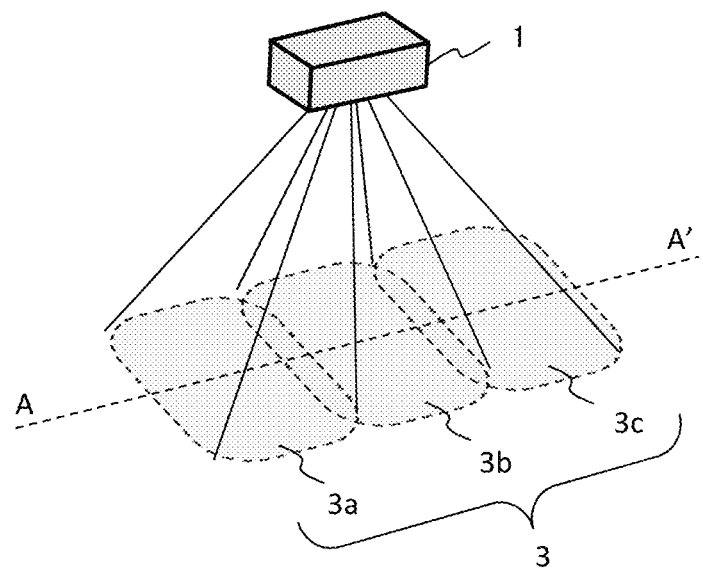
Figure 5B:
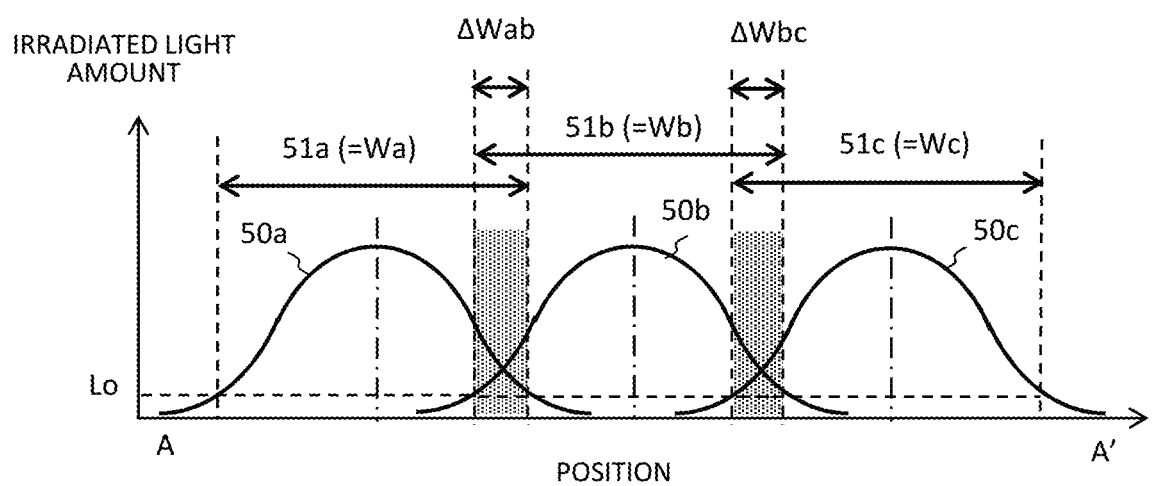

Next, a relationship between turn-on states of the laser light sources and the irradiation areas will be described with reference to FIGS. 5A, 5B, 6A, and 6B. FIGS. 5A and 5B illustrate a case where all of the three laser light sources are turned on. FIG. 5A illustrates the irradiation areas, and FIG. 5B illustrates the irradiated light amount distributions. As illustrated in FIG. 5A, the three irradiation areas 3a, 3b, and 3c partially overlap with neighboring ones. Therefore, the three irradiation areas form a single large irradiation area 3 as a whole.

FIG. 5B illustrates irradiated light amount distributions across a cross section A-A' of the irradiation areas 3a, 3b, and 3c. The light beams emitted from the laser light sources 11a, 11b, and 11c have irradiated light amount distributions 50a, 50b, and 50c, respectively, and irradiation ranges 51a, 51b, and 51c, respectively (refer to FIG. 4B). Each irradiation range has portions partially overlapping with the neighboring irradiation areas, but does not have a portion overlapping with an unneighboring irradiation range.

For example, the irradiation ranges 51a and 51b partially overlap with each other with an overlapping width ΔWab. The overlapping width ΔWab is set to be smaller than a half width Wa/2 of the irradiation range 51a and a half width Wb/2 of the irradiation range 51b.

$$\text{"0<}\Delta Wab\text{<}Wa/2\text{" and "0<}\Delta Wab\text{<}Wb/2\text{"} \tag{2a}$$

Similarly, the overlapping widths ΔWbc of the irradiation ranges 51b and 51c are also set to be smaller than a half width Wb/2 of the irradiation range 51b and a half width Wc/2 of the irradiation range 51c.

$$\text{"0<}\Delta Wbc\text{<}Wb/2\text{" and "0<}\Delta Wbc\text{<}Wc/2\text{"} \tag{2b}$$

By restricting the overlapping widths of the neighboring irradiation ranges in this manner, it is possible to prevent unneighboring irradiation ranges 51a and 51c from partially overlapping.

Figure 6A:
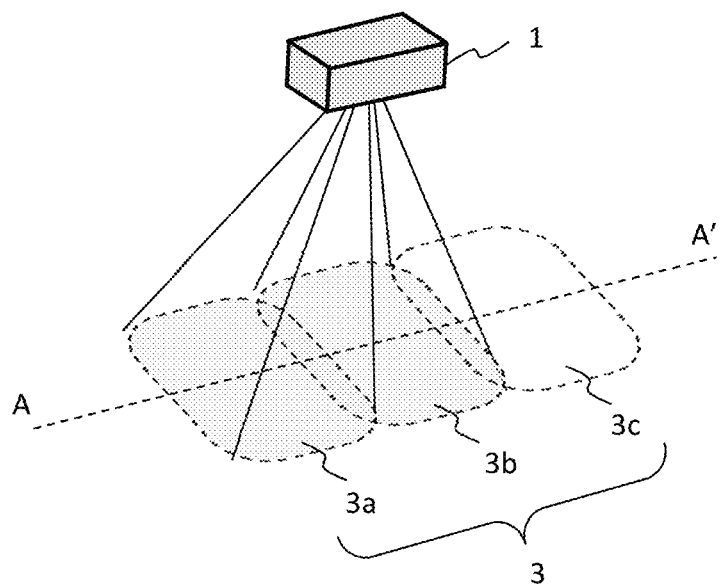
FIG. 6A is a diagram illustrating irradiation areas in a case where a part of the laser light sources is turned off.
Figure 6B:
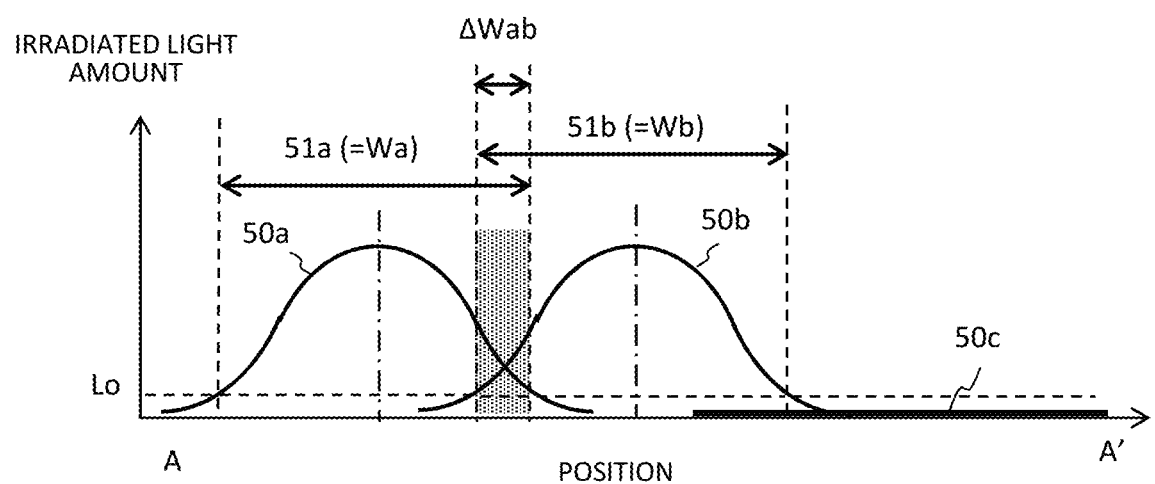
FIG. 6B is a diagram illustrating the irradiated light amount distributions in a case where a part of the laser light sources are turned off.

FIGS. 6A and 6B illustrate a case where a part of the three laser light sources are turned off. FIG. 6A illustrates the irradiation areas, and FIG. 6B illustrates the irradiated light amount distributions. In this example, the two laser light sources 11a and 11b of FIG. 4A are turned on, and the laser light source 11c is turned off. As illustrated in FIG. 6A, the entire irradiation area 3 is formed by the irradiation areas 3a and 3b from the two turned-on laser light sources, and the irradiation area 3c is excluded from the irradiation area 3 of FIG. 5A.

FIG. 6B illustrates irradiated light amount distributions across the cross section A-A' of the irradiation areas 3a, 3b, and 3c. FIG. 6B shows the irradiated light amount distributions 50a and 50b generated by the two turned-on laser light sources and their irradiation ranges 51a and 51b, respectively. Similar to FIG. 5B, the irradiation ranges 51a and 51b partially overlap with each other with the overlapping width ΔWab, and the overlapping width ΔWab satisfies the aforementioned condition (2a).

In the example of FIGS. 6A and 6B, it is assumed that the two laser light sources 11a and 11b are turned on, and the laser light source 11c is turned off. However, needless to say, which of the three laser light sources is turned on or off may be set arbitrarily.

In this manner, according to the first embodiment, a plurality of laser light sources can be individually turned on or off. Therefore, it is possible to change the irradiation areas (irradiation ranges) of the TOF camera 1. As a result, it is possible to remove ambient light during distance measurement using the TOF camera 1 and improve measurement accuracy as described below.

Figure 7A:
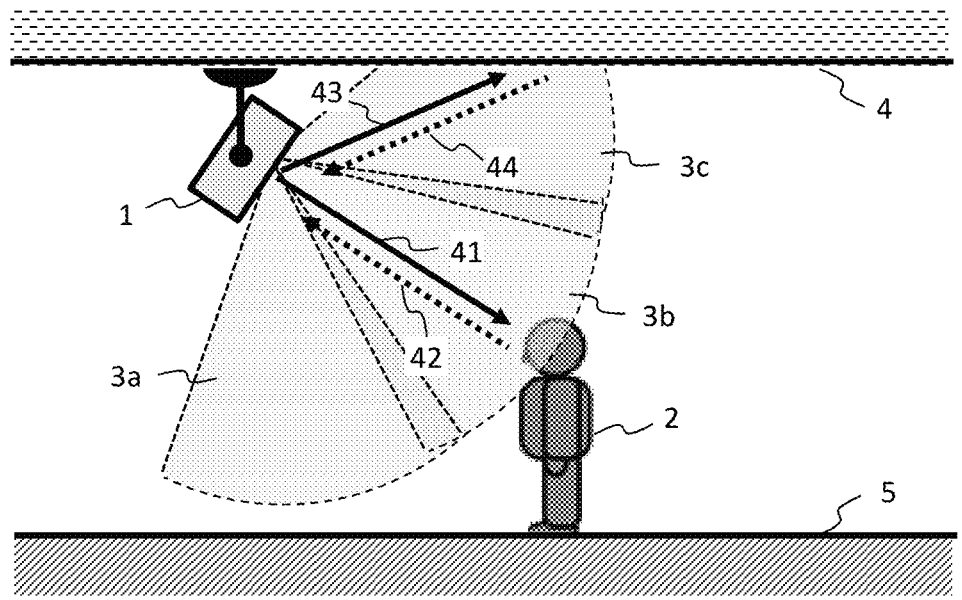
FIG. 7A is a diagram illustrating influence of ambient light caused by ceiling reflection.
Figure 7B:
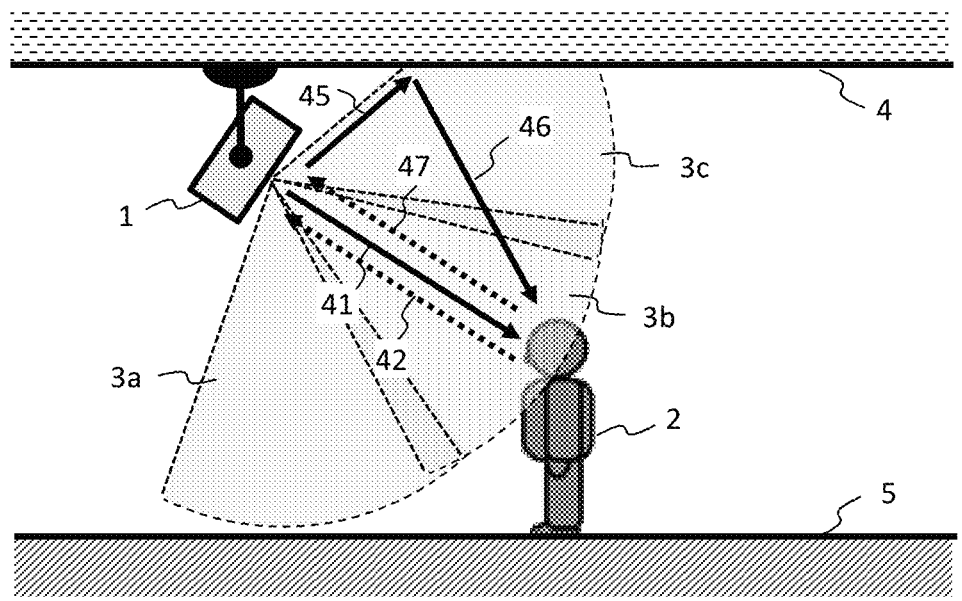
FIG. 7B is a diagram illustrating influence of ambient light caused by a multi-path.
Figure 7C:
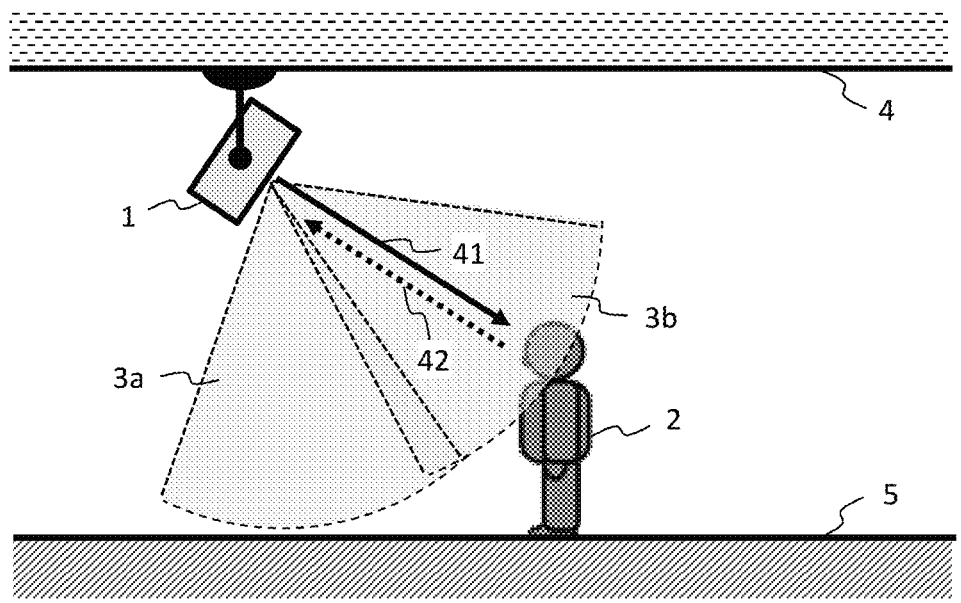
FIG. 7C is a diagram illustrating a case where a part of the laser light sources are turned off to eliminate ambient light.

FIGS. 7A to 7C are diagrams illustrating influence of ambient light during distance measurement. FIG. 7A illustrates a case where there is ambient light caused by ceiling reflection, and FIG. 7B illustrates a case where there is ambient light caused by a multi-path. FIG. 7C illustrates a case where one of the laser light sources is turned off in order to prevent ambient light.

In FIG. 7A, the TOF camera 1 is installed in the vicinity of the ceiling 4, and the irradiation areas 3a, 3b, and 3c are set by turning on all of the laser light sources. The irradiation light 41 out of the emitted light is reflected on the subject 2 as reflection light 42, which is used in three-dimensional distance measurement for the subject 2. In this case, the light irradiated from the TOF camera 1 is widened in a vertical direction as well as a direction to the subject 2. Therefore, the upper end of the irradiation range is directed to the ceiling 4, and the lower end of the irradiation range is directed to the floor face 5. Here, the subject 2 does not exist in the irradiation area 3c directed to the ceiling 4, for which distance measurement to the subject 2 using the TOF camera 1 is not necessary.

Although most of the irradiation light 43 directed to the ceiling 4 from the TOF camera 1 is reflected on the ceiling surface, a part of the irradiation light 43 serves as unnecessary reflection light 44 (hereinafter, referred to as "unnecessary light") returning to the TOF camera 1 due to diffusion on the ceiling surface. Since this unnecessary light 44 returns at a distance relatively close from the TOF camera 1, it has a large amount of light relative to the reflection light from the subject 2. For this reason, the unnecessary light 44 from the ceiling 4 serves as ambient light against the reflection light 42 from the subject 2 and degrades distance measurement accuracy.

FIG. 7B illustrates influence of ambient light generated by a multi-path in a case where all of the laser light sources are turned on. The light 45 irradiated from the TOF camera 1 to the ceiling 4 is reflected on the ceiling 4 temporarily, and then serves as irradiation light 46 directed to the subject 2 in some cases. This irradiation light 46 is reflected on the subject 2 as reflection light 47 and then returns to the TOF camera 1. That is, the TOF camera 1 detects unnecessary reflection light 47 (unnecessary light) caused by the irradiation light 46 in addition to the desired reflection light caused by the irradiation light 41. Here, a light path directed to the subject 2 but not directly irradiated from the TOF camera 1 to the subject 2 is referred to as a multi-path. If there is ambient light caused by the multi-path, the distance from the TOF camera 1 to the subject 2 apparently changes, and this degrades distance measurement accuracy.

In this regard, according to the first embodiment, the laser light source 11c that irradiates light onto the ceiling (that is, the irradiation area 3c) is turned off, so that the TOF camera 1 irradiates light only to the irradiation areas 3a and 3b as illustrated in FIG. 7C. As a result, it is possible to prevent degradation of the distance measurement accuracy of the TOF camera 1 by preventing ambient light (unnecessary light 44) caused by ceiling reflection of FIG. 7A or ambient light (unnecessary light 47) caused by the multi-path.

Figure 8A:
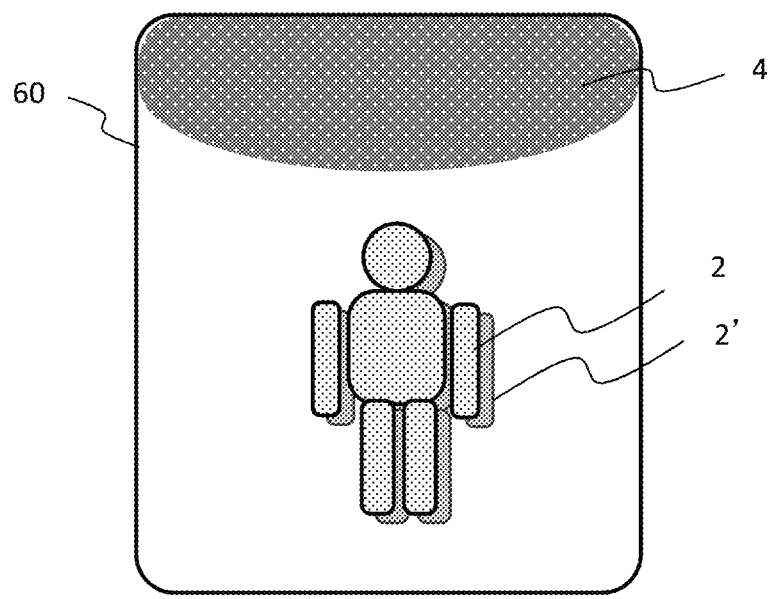
Figure 8B:
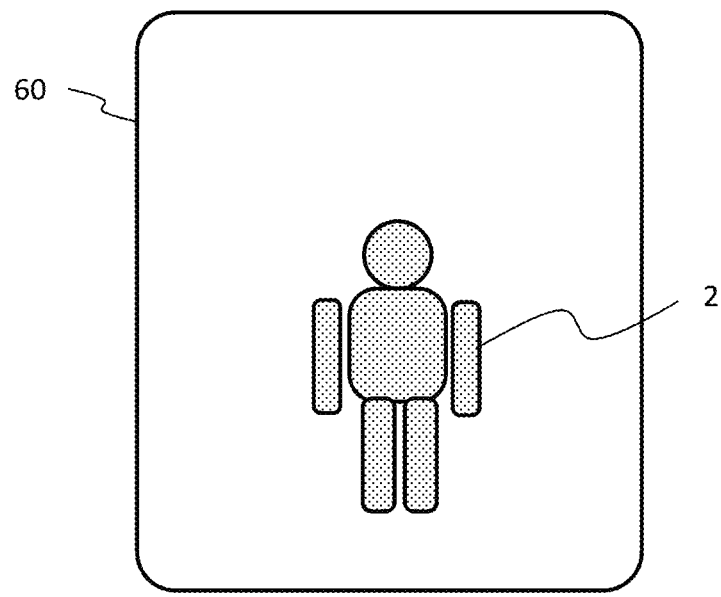
FIG. 8B is a diagram illustrating an exemplary distance image in a case where a part of the light sources are turned off.

FIGS. 8A and 8B are diagrams illustrating an exemplary distance image created by the TOF camera 1. FIG. 8A illustrates a case where the TOF camera 1 is set as illustrated in FIGS. 7A and 7B. FIG. 8B illustrates a case where the TOF camera 1 is set as illustrated in FIG. 7C.

FIG. 8A illustrates a case where all of the laser light sources are turned on. In this case, although the subject 2 is displayed on the display screen 60, a ghost phenomenon 2' is observed in a contour of the subject 2. That is, the distance measurement accuracy is degraded. This is because unnecessary light 44 caused by the ceiling 4 or unnecessary light 47 caused by the multi-path serves as a disturbance component and influences on the reflection light 42 of the subject 2.

Meanwhile, FIG. 8B illustrates a case where the laser light source 11c that irradiates light onto the ceiling 4 is turned off. Since unnecessary light 47 from the ceiling 4 is not detected, and unnecessary light 47 caused by the multi-path is not generated, it is possible to obtain a distance image having a distinct contour of the subject 2 from the TOF camera 1.

FIG. 9 is a flowchart illustrating an irradiation area setting process according to the first embodiment. The irradiation area setting process described below is executed by controlling operations of each element of FIG. 1 using the CPU 17 of the three-dimensional distance measurement apparatus. The irradiation area setting process will now be described step by step.

In S101, the light emission control unit 12 turns on all of the laser light sources of the light source unit 11. In S102, the light-receiving unit 13 detects reflection light from the subject 2, and the distance-calculating unit 14 calculates a distance to each part of the subject 2, so that the image processing unit 15 creates a distance image. In S103, the distance image created by the image processing unit 15 is displayed on an external device (display). In addition, the intensity of the reflection light detected by the light-receiving unit 13 is displayed on the external device (display) as necessary.

In S104, a user checks the displayed distance image (reflection light intensity) and determines whether or not it is necessary to change the irradiation area setting. For example, in a case where reflection light from a ceiling or a wall in the vicinity of the TOF camera 1 is strong, and it is observed as an image in a position far from the subject such as a person, it is determined that the setting change is necessary because ambient light may be generated. If there is a change instruction from a user through the input device of the CPU 17, the process advances to S106. Otherwise, if there is no change instruction, the process advances to S105. In S105, the irradiation area setting is terminated, and the three-dimensional distance measurement is continuously performed.

In S106, the installation angle detection unit 16 detects an installation angle θ of the TOF camera 1. In S107, a user changes the irradiation area setting for the light-emitting unit 10 using the input device of the CPU 17 on the basis of the displayed distance image (reflection light intensity), the installation angle of the TOF camera 1, or both the distance image and the installation angle. For example, if the irradiation area setting is based on the distance image, the irradiation area is set by excluding the ceiling or wall detected as the vicinity of the TOF camera 1 (for example, within one meter) from the irradiation area. In addition, if the irradiation area setting is based on the installation angle of the TOF camera 1, the irradiation area is set by excluding the angle range of the ceiling from the irradiation area.

In S108, for the irradiation area setting changed in S107 described above, the CPU 17 selects the laser light sources such that the irradiation can be made only for the changed irradiation areas. In S109, the light emission control unit 12 turns on only the selected laser light sources. In addition, returning to S102, the processes described above are repeated for the distance image having the changed setting.

In the aforementioned flow, a user performs determination and control for the setting change of the irradiation areas in S104 and S107. Alternatively, the CPU 17 may automatically determine and set the irradiation areas. For example, the CPU 17 may recognize a position of the subject (such as a person) in the distance image and determine whether or not there is strong reflection light from the unnecessary area (ceiling 4) as illustrated in FIG. 8A or whether or not a ghost phenomenon occurs in the contour of the subject in the distance image.

According to the first embodiment, it is possible to optimize the irradiation area depending on a situation of the subject. Therefore, it is possible to prevent unnecessary light caused by reflection light from the ceiling or the multi-path and perform distance measurement with high accuracy.

Second Embodiment

Next, a three-dimensional distance measurement apparatus according to a second embodiment will be described. In the second embodiment, the laser light sources are configured to individually adjust the emitted light amount. A basic configuration of the apparatus is similar to that of the first embodiment (FIG. 1), and it will not be described repeatedly here.

Figure 10A:
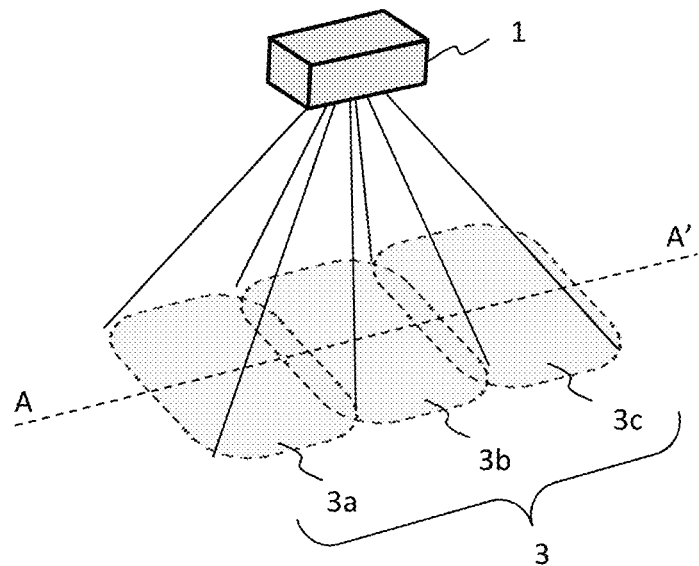
FIG. 10A is a diagram illustrating an irradiation area in a case where all of the laser light sources are turned on with the same light amount (according to a second embodiment) (note that the remaining drawings relate to the second embodiment)
Figure 10B:
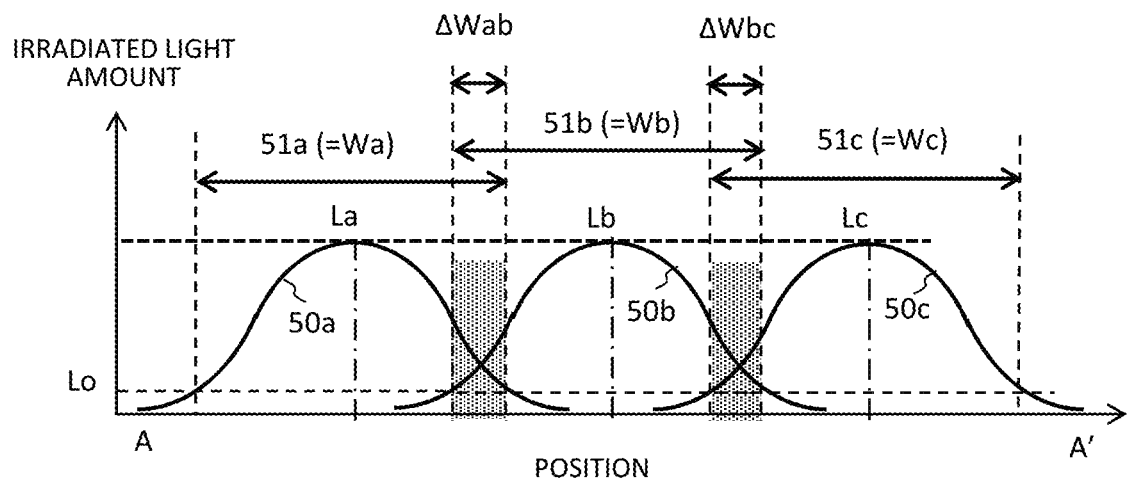
FIG. 10B is a diagram illustrating the irradiated light amount distributions in a case where all of the laser light sources are turned on with the same light amount.

A relationship between turn-on states of the laser light sources and the irradiated light amount distributions will be described with reference to FIGS. 10A, 10B, 11A, and 11B. FIGS. 10A and 10B illustrate a case where all of the three laser light sources are turned on with the same light amount. FIG. 10A illustrates the irradiation areas, and FIG. 10B illustrates the irradiated light amount distributions across the cross section A-A'. Assuming that the three irradiation areas 3a, 3b, and 3c have irradiated light amount distributions 50a, 50b, and 50c, respectively, and maximum irradiated light amounts La, Lb, and Lc, respectively, they have a relationship:

$$La=Lb=Lc \quad (3),$$

where each irradiation area has the same irradiated light amount. Note that the irradiation ranges or the overlapping widths of each irradiation area are similar to those of the first embodiment (FIG. 5). That is, relationships "Wa=Wb=Wc" and "ΔWab=ΔWbc" are established.

FIGS. 11A and 11B illustrate a case where the three laser light sources are turned on with different light amounts. FIG. 11A illustrates the irradiation areas, and FIG. 11B illustrates irradiated light amount distributions across the cross section A-A'. The three irradiation areas 3a, 3b, and 3c have different emitted light amounts (or irradiated light amounts) of the laser light sources. According to the second embodiment, the maximum irradiated light amounts La, Lb, and Lc of each irradiation area are set to:

$$La<Lb<Lc \quad (4).$$

In addition, the irradiation ranges or the overlapping widths of each irradiation area depend on the magnitude of the light amount and have relationships "Wa<Wb<Wc" and "ΔWab<ΔWbc". In this case, the irradiation ranges Wa, Wb, and Wc are determined on the basis of a light amount threshold value Lbo with respect to a reference light amount distribution (for example, the irradiated light amount distribution 50b).

In this manner, according to the second embodiment, a plurality of laser light sources can be turned on with different light amounts. Therefore, it is possible to optimize the irradiated light amount distribution in the irradiation area of the TOF camera 1. As a result, it is possible to perform distance measurement with high accuracy even when a part of the plurality of subjects are placed far from the TOF camera 1 as described below.

Figure 12A:
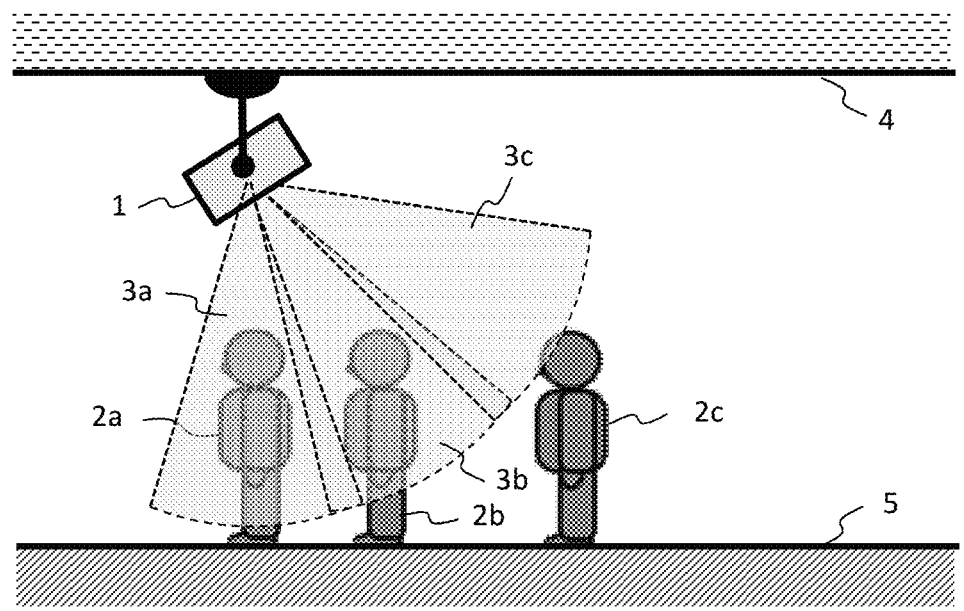
FIG. 12A is a diagram illustrating distance measurement for a plurality of subjects (assuming that the irradiated light amounts of each area are set to be equal)
Figure 12B:
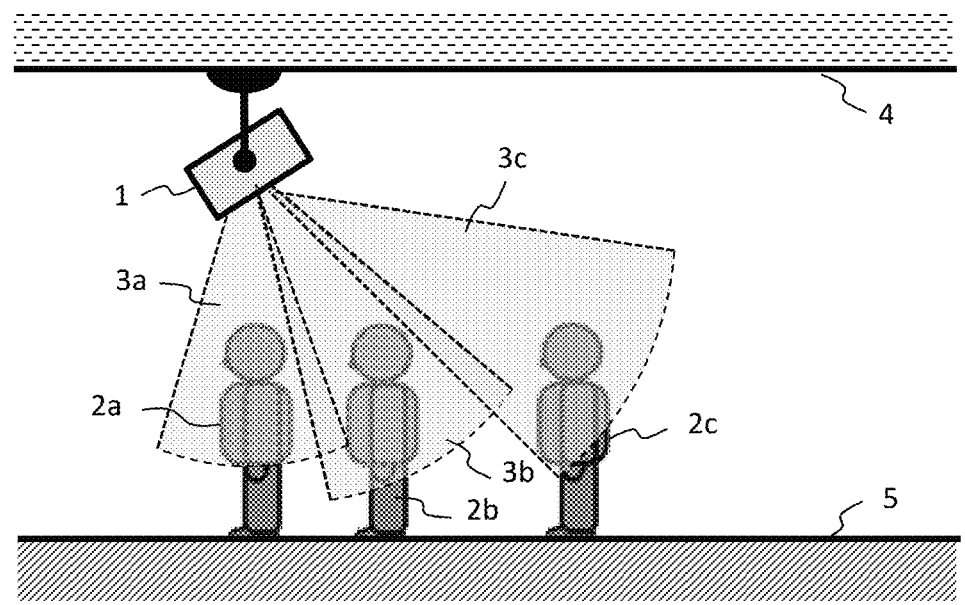
FIG. 12B is a diagram illustrating distance measurement for a plurality of subjects (assuming that the irradiated light amounts of each area are different)

FIGS. 12A and 12B illustrate a case where distance measurement is performed for a plurality of subjects having different distances. FIG. 12A illustrates a case where the irradiated light amounts of the irradiation areas are equal as illustrated in FIGS. 10A and 10B. FIG. 12B illustrates a case where the irradiated light amounts of the irradiation areas are different as illustrated in FIGS. 11A and 11B.

Referring to FIG. 12A, the TOF camera 1 is placed in the vicinity of the ceiling 4, and the irradiation areas 3a, 3b, and 3c irradiated by the TOF camera 1 are widened to cover positions of three subjects 2a, 2b, and 2c, respectively. Here, it is assumed that each subject 2a, 2b, and 2c has a different distance from the TOF camera 1.

If the irradiated light amounts of the irradiation areas 3a, 3b, and 3c are equal, the intensity of the reflection light from each subject detected by the TOF camera 1 depends on the distance from the TOF camera 1. That is, in the case of the close subjects 2a and 2b, the reflection light is sufficient, and the distance can be normally measured. However, in the case of the distant subject 2c, the reflection light is insufficient, and it may be difficult to normally measure the distance in some cases. This may similarly apply to a case where reflectivity of the subject is low.

In this regard, according to the second embodiment, the irradiated light amount distribution of the TOF camera 1 is optimized by differently setting the light amounts of each irradiation area (by turning on each laser light source with a different light amount) as illustrated in FIG. 12B. Specifically, in the case of the irradiation area 3c for the distant subject 2c, the light amount of the corresponding laser light source 11c increases. In the case of the irradiation area 3a for the close subject 2a, the light amount of the corresponding laser light source 11a decreases. As a result, it is possible to normally perform distance measurement by intensifying the reflection light from the distant subject 2c. In addition, since the reflection light intensity from the close subject 2a is sufficient, the irradiated light amount is adjusted to a suitable level. In this manner, the distance measurement is performed by optimizing the irradiated light amount distributions for all of the plurality of subjects.

Figure 13A:
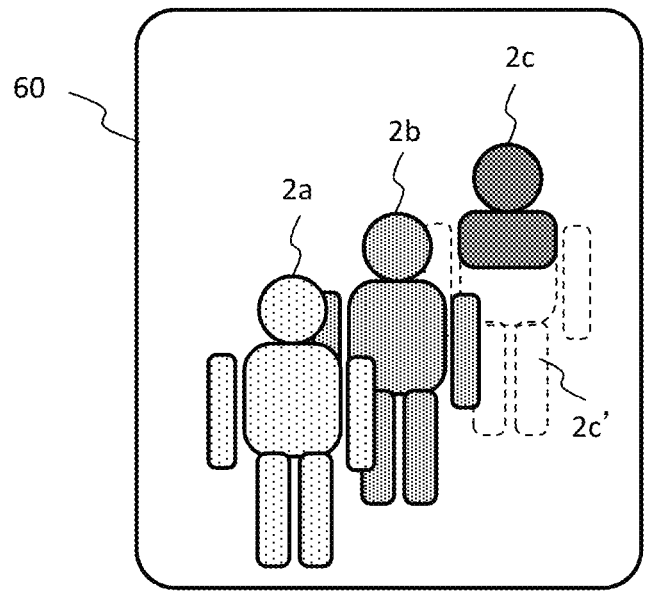
FIG. 13A is a diagram illustrating an exemplary distance image in a case where the irradiated light amounts of each area are equal.
Figure 13B:
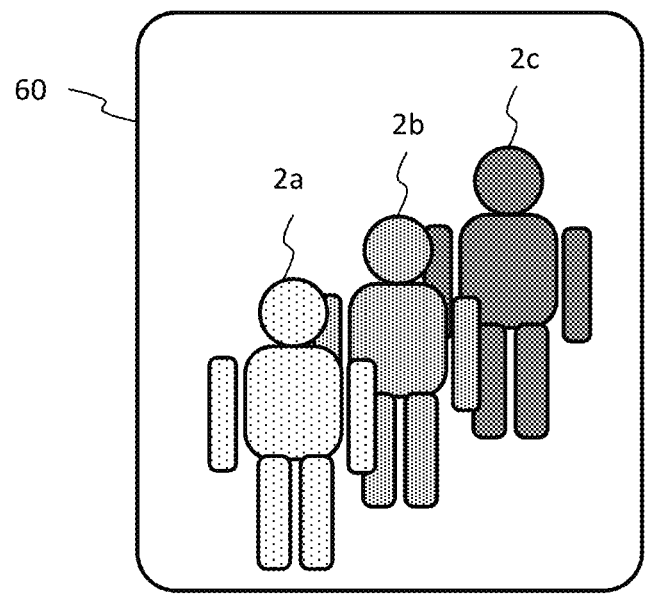
FIG. 13B is a diagram illustrating an exemplary distance image in a case where the irradiated light amounts of each area are different.

FIGS. 13A and 13B are diagrams illustrating an exemplary distance image created by the TOF camera 1. FIG. 13A illustrates a case where the setting of the TOF camera 1 is similar to that of FIG. 12A. FIG. 13B illustrates a case where the setting of the TOF camera 1 is similar to that of FIG. 12B.

In FIG. 13A, the irradiated light amounts of each irradiation area are set to be equal as illustrated in FIG. 12A. Although three subjects 2a, 2b, and 2c are displayed in the display screen 60, a lower half body 2c' of the subject 2c is not displayed. This is because the irradiated light amount to the subject 2c which is farthest from the TOF camera 1 is small, so that distance measurement is not normally performed for a lower half body 2c' of the subject 2c, and the image is partially deficient.

Meanwhile, FIG. 13B illustrates a case where the irradiated light amount to the irradiation area increases as the distance from the TOF camera 1 increases. From the three subjects 2a, 2b, and 2c having different distances, distance images of the entire bodies can be obtained. In this manner, by adjusting the irradiated light amount distributions for all of the irradiation areas, it is possible to obtain the reflection light amount necessary for any one of the subjects 2a, 2b, and 2c and normally perform distance measurement for a person or the like across the entire irradiation area.

Figure 14:
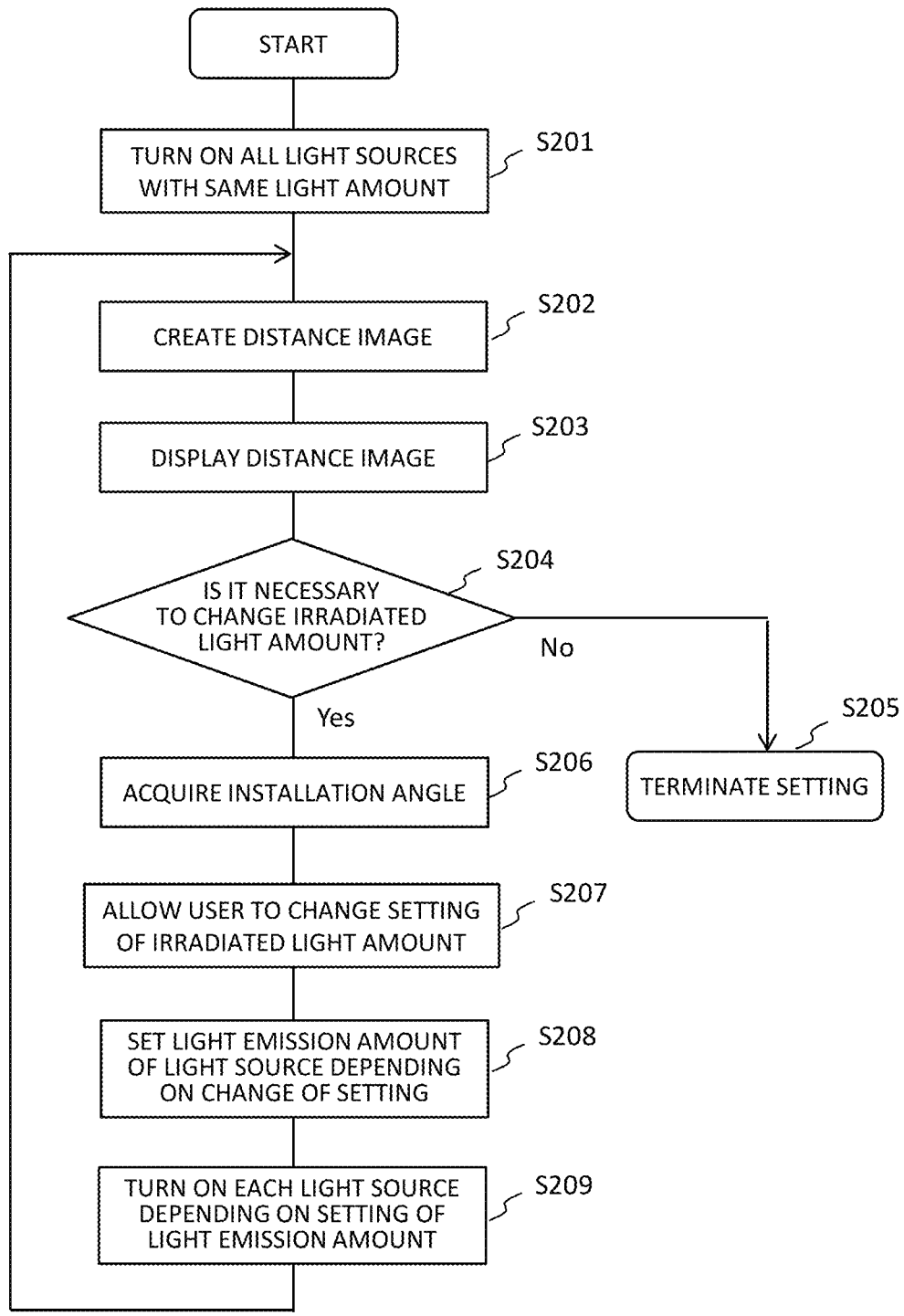
FIG. 14 is a flowchart illustrating an irradiated light amount distribution setting process.

FIG. 14 is a flowchart illustrating an irradiated light amount distribution setting process according to the second embodiment. The irradiated light amount distribution setting process described below is executed by controlling operations of each element of FIG. 1 using the CPU 17 of the three-dimensional distance measurement apparatus. The irradiated light amount distribution setting process will now be described step by step.

In S201, the light emission control unit 12 turns on all of the laser light sources of the light source unit 11 with the same light amount. In S202, the light-receiving unit 13 detects the reflection light from the subject 2, and the distance-calculating unit 14 calculates distances to each part of the subject 2, so that the image processing unit 15 creates a distance image. In S203, the distance image is displayed on the external device (display). The reflection light intensity detected by the light-receiving unit 13 is displayed on the external device (display) as necessary.

In S204, a user checks the displayed distance image (reflection light intensity) and determines whether or not it is necessary to change the irradiation area setting. For example, in a case where the subject image has a deficient portion, it is necessary to increase the irradiated light amount of the corresponding irradiation area. In addition, it is also necessary to adjust the irradiated light amount in a case where the reflection light intensity on the continuous floor face is not uniform. If there is a change instruction from a user through the input device of the CPU 17, the process advances to S206. Otherwise, if there is no change instruction, the process advances to S205. In S205, the irradiated light amount setting is terminated, and the three-dimensional distance measurement is continuously performed.

In S206, the installation angle detection unit 16 detects the installation angle θ of the TOF camera 1. In S207, a user changes the irradiated light amount setting for each irradiation area using the input device of the CPU 17 on the basis of the displayed distance image (reflection light intensity), the installation angle of the TOF camera 1, or both the distance image and the installation angle. For example, if the irradiated light amount setting is based on the distance image, and there is a deficient portion in the subject image, the irradiated light amount of the corresponding irradiation area is set to increase. In addition, if the irradiated light amount setting is based on the installation angle of the TOF camera 1, the irradiated light amount is set to increase in the horizontal direction and decrease in the vertical direction to the floor face in order to obtain a uniform reflection light intensity from the floor face.

In S208, for the irradiated light amount distribution setting changed in S207 as described above, the CPU 17 sets the emitted light amount of each light source so as to obtain the changed irradiated light amount distribution. In S209, the light emission control unit 12 turns on each laser light source depending on the corresponding emitted light amount setting. In addition, returning to S202, the processes described above are repeated for the distance image having the changed setting.

In the aforementioned flow, a user performs determination and control for the setting change of the irradiated light amount in S204 and S207. Alternatively, the CPU 17 may automatically determine and set the irradiated light amount. For example, the CPU 17 may recognize a position of the subject (such as a person) in the distance image and determine whether or not there is a deficient portion in the subject image as illustrated in FIG. 13A or whether or not the reflection light intensity is uniform across the continuous floor face.

According to the second embodiment, it is possible to optimally adjust the irradiated light amount distribution for a plurality of subjects having different distances. Therefore, it is possible to prevent an excessive or short detection light amount during the three-dimensional distance measurement and perform distance measurement for each subject with high accuracy.

In each embodiment described above, it is assumed that three laser light sources are provided. However, needless to say, the number of the light sources and their types are not limited thereto.

What is claimed is:

1. A three-dimensional distance measurement apparatus that outputs a position of a subject as a distance image, comprising:
   a time-of-flight (TOF) camera which includes:
   a plurality of light sources that irradiate light onto the subject,
   a light emission controller configured to turn on and turn off light emission from the plurality of light sources, and
   a sensor configured to detect reflection light from the subject; and
   a central processing unit (CPU) programmed to control the TOF camera,
   wherein the TOF camera is configured to:
   calculate three-dimensional distances to the subject on the basis of transmission times of the reflection light detected at pixel positions of the sensor, and
   create a two-dimensional distance image of the subject on the basis of the calculated three-dimensional distance data, and
   wherein a plurality of irradiation areas, onto which the light from the plurality of light sources are irradiated, are arranged to partially overlap only with the neighboring ones of the irradiation areas.

2. The three-dimensional distance measurement apparatus according to claim 1, wherein a respective overlapping width between the neighboring ones of the irradiation areas is smaller than a half of a width of each of the neighboring ones of the irradiation areas.

3. The three-dimensional distance measurement apparatus according to claim 1, wherein the light emission controller is configured to individually turn on and turn off the light emission from each of the plurality of light sources, or individually adjust emitted light amounts from each of the plurality of light sources.

4. The three-dimensional distance measurement apparatus according to claim 3, wherein the light emission controller is configured to turn on all of the plurality of light sources to irradiate light onto the subject, and
   wherein the CPU is programmed to:
   display the two-dimensional distance image and an intensity of the reflection light detected by the sensor,
   receive a change instruction for preventing light from being irradiated onto a specified irradiation area among the plurality of irradiation areas from a user, and
   control the light emission controller to individually turn off one of the light sources corresponding to the specified irradiation area for which the change instruction is received.

5. The three-dimensional distance measurement apparatus according to claim 3, wherein the light emission controller is configured to turn on the plurality of light sources with a same emitted light amount to irradiate light onto the subject, wherein the CPU is programmed to:

display the two-dimensional distance image and an intensity of the reflection light detected by the sensor, receive a change instruction for increasing or decreasing the irradiated light amount of a specified irradiation area among the plurality of irradiation areas from a user, and control the light emission controller to individually increase or decrease the emitted light amount of the one of the light sources corresponding to the specified irradiation area for which the change instruction is received.

* * * * *